Patented Aug. 11, 1931

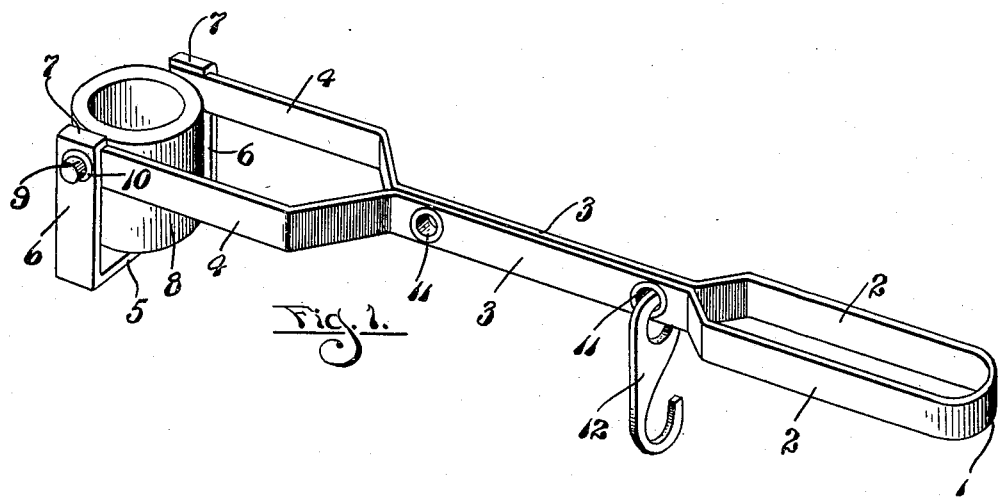
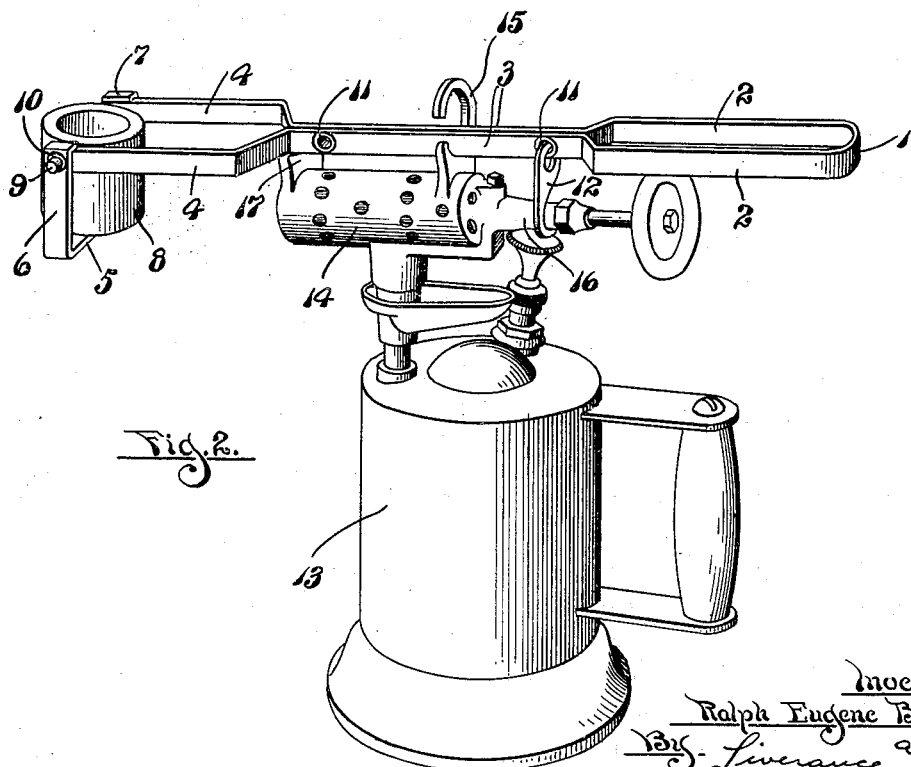

1,818,925

UNITED STATES PATENT OFFICE

RALPH EUGENE BROWN, OF EVANSTON, ILLINOIS

SOLDERING POT

Application filed December 2, 1929. Serial No. 410,963.

This invention relates to a soldering pot appliance designed particularly for handling a soldering pot in connection with a heating torch therefor. It is a primary object and purpose of the present invention to provide a holding and handling device for soldering pots which can be very readily placed in a position for heating on a blow torch and which with the solder may be instantly removed and carried to the place where the solder is to be used, and which also may be set down upon the floor or other support without danger or damage to such support by reason of high temperature of the solder which the pot contains. A further object of the invention is to provide a construction of the type stated, which is of a simple and economical manufacture and which can be produced at a low cost. To these ends, as well as many others not at this time specifically stated, I have made the invention, an understanding of which may be had from the following description taken in connection with the accompanying drawings, in which, Fig. 1 is a perspective view of the soldering pot holding and handling device of my invention, and Fig. 2 is a perspective view showing the same construction upon a heating blow torch.

Like reference characters refer to like parts in the different figures of the drawings.

In the construction of the device, a length of flat material, preferably wire flattened at both sides, is bent at its middle point at 1 into U-shape, the legs 2 extending from the bend for a distance parallel to each other, and then converged so as to bring the continuations 3 in close engagement with each other. Such parts 3 are bent outwardly and diverged from each other and are then continued in two spaced sides 4 forming a fork between the ends of which the soldering pot is located.

The legs 2 described with the bend 1 connecting the same form a handle which may be readily grasped to carry the entire device in the hands.

At the ends of the sides 4 of the fork described a supporting stirrup is used bent into U-shape from a length of flat metal to provide a horizontal bottom 5 with vertical legs 6 the upper ends of which are turned inwardly making lips 7 as shown. The soldering pot 8 is of cast metal, relatively thick, so as to hold heat for a long time and keep the solder long in a molten condition. The solder pot is located between the legs of the stirrup and pins 9 pass through tubular rivets or eyes 10 which connect the stirrup legs to the sides 4 of the fork described. It is evident that with this construction the stirrup is held against movement with respect to the sides 4 due to the stops provided by the lips 7 which bear upon the upper edges of the sides 4, while the soldering pot may have a swinging movement on the axes of the pins or trunnions 9 which are cast integral with the pot.

In the assembly of the parts the sides 4 of the fork are spread apart, the tubular eyes or rivets 10 passed therethrough and the soldering pot trunnions passed through said eyes which also, at the same time, are passed through the sides 6 of the stirrup, after which the tubular eyes are spun or rolled at their outer ends in the usual manner. This brings the two parts 3 together and these are permanently secured together by additional eyes or tubular rivets 11 as shown. A hook 12 passes through one of the eyes 11, the one nearest the handle part of the structure and hangs down therefrom, as fully shown in Fig. 1.

The structure is very readily applied to a heating blow torch of conventional construction which includes a vertical receptacle 13 above which is a horizontal cylinder 14 through which the flame of the torch is directed. Near one end of the cylinder there is an upwardly extending hook 15, open at one side, and from the adjacent end of the cylinder a horizontal stem 16 extends. In some cases, though not in all, at the opposite end of cylinder 14 a supporting lug 17 projects upward. The construction of the blow torch is one very well known and the description thereof need not be therefore extended.

The appliance described is placed above the cylinder 14 entering its intermediate portion formed of the sides 3 through the opening in the hook 15 and then engaging the hook 12 with the stem 16. If the lug 17 described is not on the cylinder the device is fully supported by the parts 15 and 16, while if the lug 17 is a part of the construction of the blow torch the appliance extends thereover and rests thereon. The soldering pot 8 is disposed directly in front of cylinder 14, whereby the flame projecting out of the adjacent end of the cylinder 14 strikes directly against the pot, and the solder may be very easily and quickly melted.

When the solder is heated and melted to the desired condition the device is easily detached from the blow torch and may readily be carried to its place. The stirrup under the pot may be placed on the floor or other support without danger thereto.

The device described is very practical for the purposes for which it is designed and has proved particularly satisfactory in service. It is of simple and economical manufacture. The invention is defined in the appended claims and is to be considered comprehensive in all forms of structure coming within the scope of the claims.

I claim:

1. A device of the class described comprising, an intermediate body, a handle at one end, and a fork having spaced apart sides at the other end of the body, a U-shaped stirrup of flat metal having a bottom and vertical legs, said legs extending at their upper portions at the outer sides of said sides of the fork, lips turned inwardly from the upper ends of said sides of the stirrup over the upper edges of the fork, tubular eyes connecting said sides of the stirrup and fork, a metal pot open at its upper end located between the sides of said stirrups, and trunnions projecting from said pot through the eyes connecting the stirrup and fork.

2. A device of the class described comprising, an intermediate elongated body, a handle at one end thereof and a fork at the other end all formed from a single length of flat metal bent at its middle and having spaced apart sides forming the handle, contacting sides forming the body and diverging spaced apart sides forming the fork, means for connecting the sides of said body together, a U-shaped stirrup formed from a length of flat metal having a bottom and vertical legs, said legs passing alongside the ends of the sides of the fork, lips turned inwardly from the upper ends of the sides of said stirrup over the upper edges of the sides of said fork, tubular eyes connecting the sides of said stirrup and fork, a metal pot located between the sides of the stirrup, trunnions extending therefrom through said eyes, and a hook suspended from the body of said device adjacent the handle.

3. A soldering pot appliance comprising, an intermediate elongated body, a handle at one end thereof and a fork at the other end all formed from a single length of flat metal bent at its middle and having spaced apart sides forming the handle, contacting sides forming the body and diverging spaced apart sides forming the fork, said body having a hole therethrough, a hollow rivet inserted through said hole whereby the sides of the body are held together, a U-shaped stirrup formed from the length of flat metal having a bottom and vertical legs, said legs passing alongside the ends of the sides of the fork, lips turned inwardly from the upper ends of the sides of said stirrup over the upper edges of the sides of said fork, tubular eyes connecting the sides of said stirrup, and fork, a metal pot located between the sides of the stirrup, trunnions extending therefrom through said eyes, and a hook suspended from said hollow rivet.

4. A device of the class described comprising, an elongated body, a handle at one end of the body, a fork having spaced apart sides at the opposite end, a U-shaped stirrup secured to said fork at the ends of the sides thereof and extending below the same, a soldering pot mounted between the ends of said fork above the stirrup and a hook suspended from said body adjacent the handle, for the purposes described.

5. In a device of the class described, a length of flat metal bent at its middle and formed into a handle portion with spaced apart sides, an intermediate body portion having contacting sides and a fork having spaced apart sides, means connecting the sides of the body portion together, a U-shaped stirrup formed from flat metal secured to the ends of the fork against movement with respect thereto and extending below said fork, and a metal pot open at its upper end mounted between the sides of said fork and of said stirrup, said means for securing the sides of said body together comprising tubular eyes located one adjacent the handle and the other adjacent said fork.

In testimony whereof I affix my signature.

RALPH EUGENE BROWN.